US006708800B2

(12) United States Patent
Kieffer et al.

(10) Patent No.: US 6,708,800 B2
(45) Date of Patent: Mar. 23, 2004

(54) EXTENDING LADDER AND ASSOCIATED MANUFACTURING METHODS

(75) Inventors: Mitchell I. Kieffer, Minneapolis, MN (US); Wang Kuo Hua, Taipei (TW); Craig S. Aizman, St. Louis Park, MN (US)

(73) Assignees: Core Distribution, Inc., Minneapolis, MN (US); Urban Sporting Goods, Guangdong (CN)

(*) Notice: Subject to any disclaimer, the term of this patent is extended or adjusted under 35 U.S.C. 154(b) by 0 days.

(21) Appl. No.: 10/211,930

(22) Filed: Aug. 2, 2002

(65) Prior Publication Data

US 2004/0020718 A1 Feb. 5, 2004

(51) Int. Cl.[7] .............................. E06C 1/00; E06C 5/04; F16B 7/10

(52) U.S. Cl. ..................... 182/195; 182/207; 403/109.1

(58) Field of Search ................................ 182/195, 207, 182/209, 194, 228.1, 166, 210, 211; 403/109.1, 109.2, 109.3, 109.5, 109.6, 109.7, 109.8; 248/161, 125.8

(56) References Cited

U.S. PATENT DOCUMENTS

| | | | | |
|---|---|---|---|---|
| 3,033,309 A | | 5/1962 | Fugere | |
| 3,451,506 A | | 6/1969 | Neal | |
| 3,653,463 A | | 4/1972 | Neal et al. | |
| 4,002,223 A | | 1/1977 | Bernkrant | |
| 4,119,177 A | | 10/1978 | Andersson | |
| 4,429,766 A | | 2/1984 | Alimbau Marques | |
| 4,448,283 A | | 5/1984 | Marques | |
| 4,457,391 A | | 7/1984 | Alimbau Marques | |
| 4,574,918 A | | 3/1986 | Marques | |
| 4,627,149 A | | 12/1986 | Colas | |
| 4,967,484 A | * | 11/1990 | Nosek | 403/109.8 |
| 4,989,692 A | | 2/1991 | Min | |
| 5,417,511 A | * | 5/1995 | Warden | 403/109.5 |
| 5,492,430 A | * | 2/1996 | Jones | 403/109.5 |
| 5,495,915 A | | 3/1996 | Weston et al. | |
| 5,593,239 A | * | 1/1997 | Sallee | 403/109.3 |
| 5,738,186 A | | 4/1998 | Jones | |
| 5,743,355 A | | 4/1998 | McDonnell et al. | |
| 5,924,658 A | * | 7/1999 | Shiery et al. | 248/125.8 |
| 6,006,399 A | * | 12/1999 | Massaro | 403/109.5 |
| 6,361,002 B1 | * | 3/2002 | Cheng | 248/161 |
| 6,461,074 B2 | * | 10/2002 | Taylor | 403/109.1 |
| 6,520,291 B2 | * | 2/2003 | Andrey | 182/116 |

* cited by examiner

*Primary Examiner*—Hugh B. Thompson, II
(74) *Attorney, Agent, or Firm*—Fredrikson & Byron, P.A.

(57) ABSTRACT

Extending ladders and associated manufacturing methods are disclosed. A ladder in accordance with an exemplary embodiment of the present invention comprises a plurality of rung units, each rung unit including a left column, a right column, and a rung extending between the left column and the right column. The ladder may include a first column assembly including a first column and a ring coupled to the first column proximate a distal end thereof, and a second column assembly including a second column and a sleeve coupled to the second column proximate a proximal end thereof. The second column being at least partially disposed within a lumen defined by an internal surface of the first column. The sleeve includes an external guiding surface for contacting the internal surface of the first column and the ring includes an internal guiding surface for contacting an exterior surface of the second column.

30 Claims, 12 Drawing Sheets

EXTENDING LADDER AND ASSOCIATED MANUFACTURING METHODS

FIELD OF THE INVENTION

The present invention relates generally to ladders. More particularly, the present invention relates to ladders having a plurality of slidable, nesting rung units.

BACKGROUND

The maintenance tasks which arise in homes, apartments, farms, factories and other places frequently call for the use of a ladder. When the ladder is not being used it must be stored someplace. While a longer ladder allows a person to reach more places, it may also be more awkward to handle and may take up more space when it is stored. An extending ladder can be placed in an extended state while it is being used and can be placed in a collapsed state while it is being stored. It would be desirable to provide a ladder having a collapsed state in which the ladder can be stored in a closet, under a bed, or in a car trunk.

SUMMARY OF THE INVENTION

Extending ladders and associated manufacturing methods are disclosed. A ladder in accordance with an exemplary embodiment of the present invention comprises a plurality of rung units, each rung unit including a left column, a right column, and a rung extending between the left column and the right column. The left columns are disposed in a nested arrangement for relative lengthwise movement in a telescopic fashion. Likewise, the right columns are also disposed in a nested arrangement for relative lengthwise movement in a telescopic fashion. In one aspect of a ladder in accordance with an exemplary embodiment of the present invention, a strap is disposed around the rungs for selectively precluding relative movement between the rung units.

A ladder in accordance with an exemplary embodiment of the present invention includes a first column assembly and a second column assembly disposed in a nested arrangement for relative lengthwise movement in a telescopic fashion. The first column assembly includes a first column and a ring that is coupled to the first column proximate a distal end thereof. The second column assembly includes a second column and a sleeve that is coupled to the second column proximate a proximal end thereof.

A portion of the second column assembly is disposed within a lumen defined by an internal surface of the first column so that an external guiding surface of the sleeve contacts the internal surface of the first column. An internal guiding surface of the ring contacts an exterior surface of the second column. In certain advantageous implementations, the first column assembly and the second column assembly contact one another only where the internal guiding surface contacts the exterior surface of the second column and where the external guiding surface contacts the internal surface of the first column.

In some implementations, the first column comprises a first material and the sleeve comprises a second material different from the first material. In certain advantageous implementations, the first material and the second material are selected so that galling is unlikely to occur when the first column and the sleeve are placed in sliding contact with one another. Also in certain advantageous implementations, the first material and the second material are selected so that a relatively low friction interface is provided when the first column and the sleeve are placed in sliding contact with one another. In some cases, the first material comprises aluminum and the second material comprises a polymeric material.

In some implementations, the second column comprises a first material and the ring comprises a second material different from the first material. In certain advantageous implementations, the first material and the second material are selected so that galling is unlikely to occur when the second column and the ring are placed in sliding contact with one another. Also in certain advantageous implementations, the first material and the second material are selected so that a relatively low friction interface is provided when the second column and the ring are placed in sliding contact with one another. In some cases, the first material comprises aluminum and the second material comprises a polymeric material.

In one aspect of a ladder in accordance with an exemplary embodiment of the present invention, the sleeve includes a landing surface and the first column includes a stop. When this is the case, the landing surface of the sleeve may advantageously contact the stop when a desired level of extension between the first column and the second column has been reached. In certain implementations, the stop comprises an inward projection. The inward projection may comprise, for example, a portion of a wall of the first column which has been displaced inwardly.

In an additional aspect of a ladder in accordance with an exemplary embodiment of the present invention, a ferrule is interposed between the external surface of the first column and an annular wall of the connector. In some advantageous implementations, the ferrule and the first column are fixed to one another at an interference fit joint formed between the ferrule and the first column. Also in some advantageous implementations, the ferrule and the connector are fixed to one another at an interlocking connection. In some cases, for example, the mechanically interlocking connection may comprise at least one protrusion of the ferrule which is received by a hole of the connector.

In another aspect of a ladder in accordance with an exemplary embodiment of the present invention, the sleeve is coupled to the second column at a mechanically interlocking connection. In certain implementations, the sleeve includes a plurality of protuberances which are received within openings defined by the second column for fixing the sleeve to the second column.

In still another aspect of a ladder in accordance with the present invention, the ladder may include a latch mechanism for selectively locking the second column relative the first column. In some cases, a button is operatively coupled to the latch mechanism for actuating the latch mechanism. In certain advantageous implementations, the button includes a depression which is dimensioned to receive a tip portion of the thumb of a ladder users hand. In certain particularly advantageous implementations, the button is shaped and positioned so that a depression of the button receives the tip portion of the thumb while the first column is grasped between a palm of the hand and at least one finger of the hand.

In yet another aspect of a ladder in accordance with an exemplary embodiment of the present invention, the ladder may include a plurality of collars. Each collar may be disposed about a column of the ladder. In certain advantageous implementations of the present invention, each collar is dimensioned so that a first connector will contact a first landing surface of the collar and a second connector will contact a second landing surface of the collar when the ladder is placed in a collapsed state.

Implementations of the present invention are possible in which the ring is coupled to the first column in a manner which allows the ring to float relative to the first column. In certain implementations, the ring is coupled to the first column by a connector which retains the ring in axial and radial directions relative to the first column while, at the same time, permitting some relative motion between the first column and the ring. When this is the case, the relative motion provided between the first column and the ring may advantageously have a magnitude which is sufficient to allow the ring to assume a position in which an internal guiding surface of the ring is disposed in coaxial alignment with the external guiding surface of the sleeve.

A method for assembling a ladder in accordance with the present invention may comprise the steps of 1) providing a connector having an annular wall defining a socket and a hole communicating with the socket; 2) inserting a ring into the socket of the connector; 3)inserting a ferrule into the socket of the connector; 4) locking the ferrule relative to the connector; and 5) inserting a column into a receptacle defined by the ferrule. In some advantageous methods, an interference fit joint is formed when the column is inserted into the receptacle defined by the ferrule. Also in some advantageous methods, the step of locking the ferrule relative to the connector comprises directing at least one protrusion of the ferrule into a hole of the connector.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
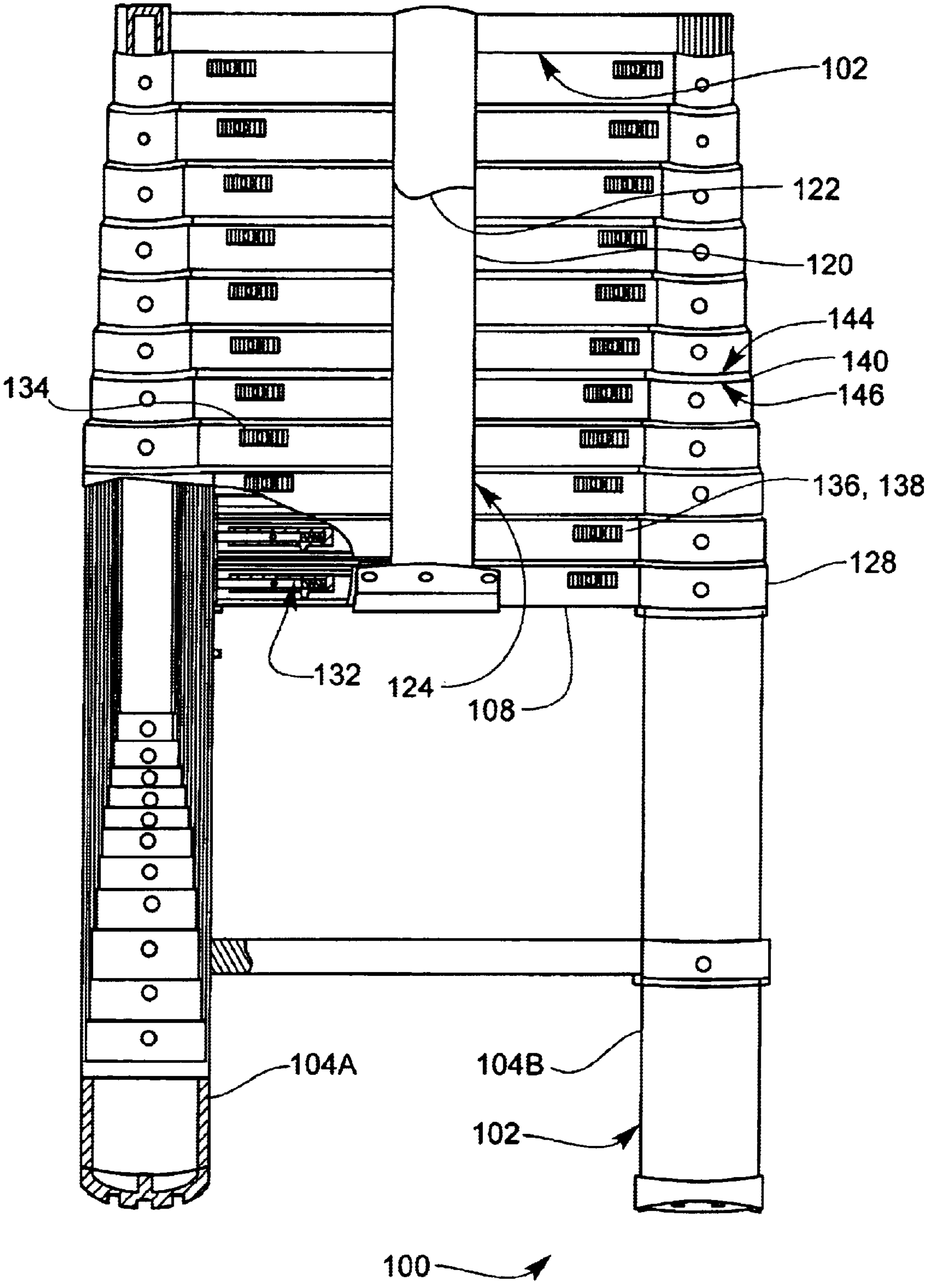
FIG. 1 is a plan view of a ladder in accordance with an exemplary embodiment of the present invention.

FIG. 1 is a plan view of a ladder 100 in accordance with an exemplary embodiment of the present invention. Ladder 100 includes a plurality of rung units 102. Each rung unit comprises a left column 104A, a right column 104B, and a rung 108 extending between the left column 104A and the right column 104B. In FIG. 1 it may be appreciated that all of the right columns are disposed in a nested arrangement for relative lengthwise movement in a telescopic fashion. In FIG. 1 it may also be appreciated that all of the left columns are also disposed in a nested arrangement for relative lengthwise movement in a telescopic fashion.

In the embodiment of FIG. 1, ladder 100 is disposed in a generally collapsed shape. In FIG. 1, a strap 120 is disposed around rungs 108 for precluding relative movement between the rung units 102. Two ends 122 of strap 120 may be selectively fixed to one another to form a loop 124, for example, using hook and loop fasteners.

In the embodiment of FIG. 1, each column 104 is coupled to a rung 108 by a connector 128. Each rung units 102 includes a left latch mechanism 132 including a left button 134. Each rung units 102 also includes a right latch mechanism 136 including a right button 138. Left button 134 and right button 138 are operatively coupled to left latch mechanism 132 and right latch mechanism 136 respectively for actuating those mechanisms. Each left latch mechanism 132 and each right latch mechanism 136 is preferably capable of selectively locking one column relative to another column.

Ladder 100 also includes a plurality of collars 140. Each collar 140 is disposed about a column 104. Each collar 140 includes a first landing surface 144 and a second landing surface 146. In FIG. 1, a first connector 128 may be seen contacting the first landing surface 144 of each collar 140 and a second connector 128 may be seen contacting the second landing surface 146 of each collar 140.

Figure 2:
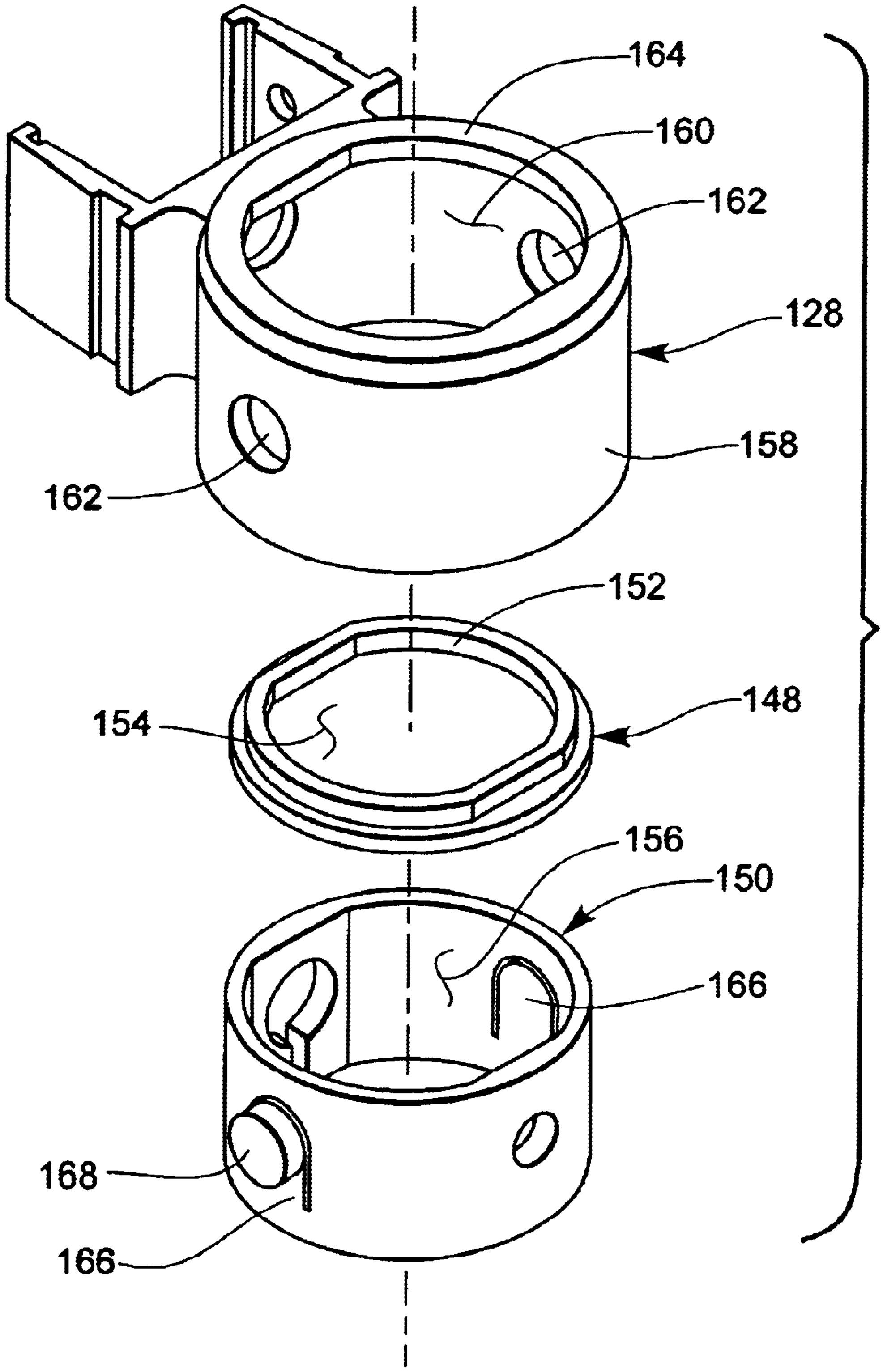
FIG. 2 is an exploded perspective view of an assembly in accordance with an exemplary embodiment of the present invention.

FIG. 2 is an exploded perspective view of an assembly in accordance with an exemplary embodiment of the present invention. The assembly of FIG. 2 includes a connector 128, a ring 148, and a ferrule 150. Ring 148 includes an internal guiding surface 152 defining an aperture 154 and ferrule 150 defines a receptacle 156. In a preferred embodiment, receptacle 156 is dimensioned to receive a distal portion of a first column and aperture 154 is dimensioned to receive a second column.

Connector 128 comprises an annular wall 158 defining a socket 160 and a plurality of holes 162 communicating with socket 160. Connector 128 also includes a shoulder 164 which can be see protruding inward from annular wall 158. Socket 160 is preferably dimensioned to receive ring 148 and ferrule 150.

In the embodiment of FIG. 2, ferrule 150 comprises a plurality ears 166. A protrusion 168 is fixed to each ear 170. In some embodiments of the present invention, holes 162 defined by connector 128 and protrusions 172 of ferrule 150 are dimensioned relative to one another so that a protrusion 168 may be received in each hole 162. In these embodiments, ears 176 may resiliently deflect when ferrule 150 is first inserted into socket 160 of connector 128. Ferrule 150 may be positioned to that each protrusion 168 is received in a hole 162 to form an interlocking mechanical connection between ferrule 150 and connector 128.

Figure 3:
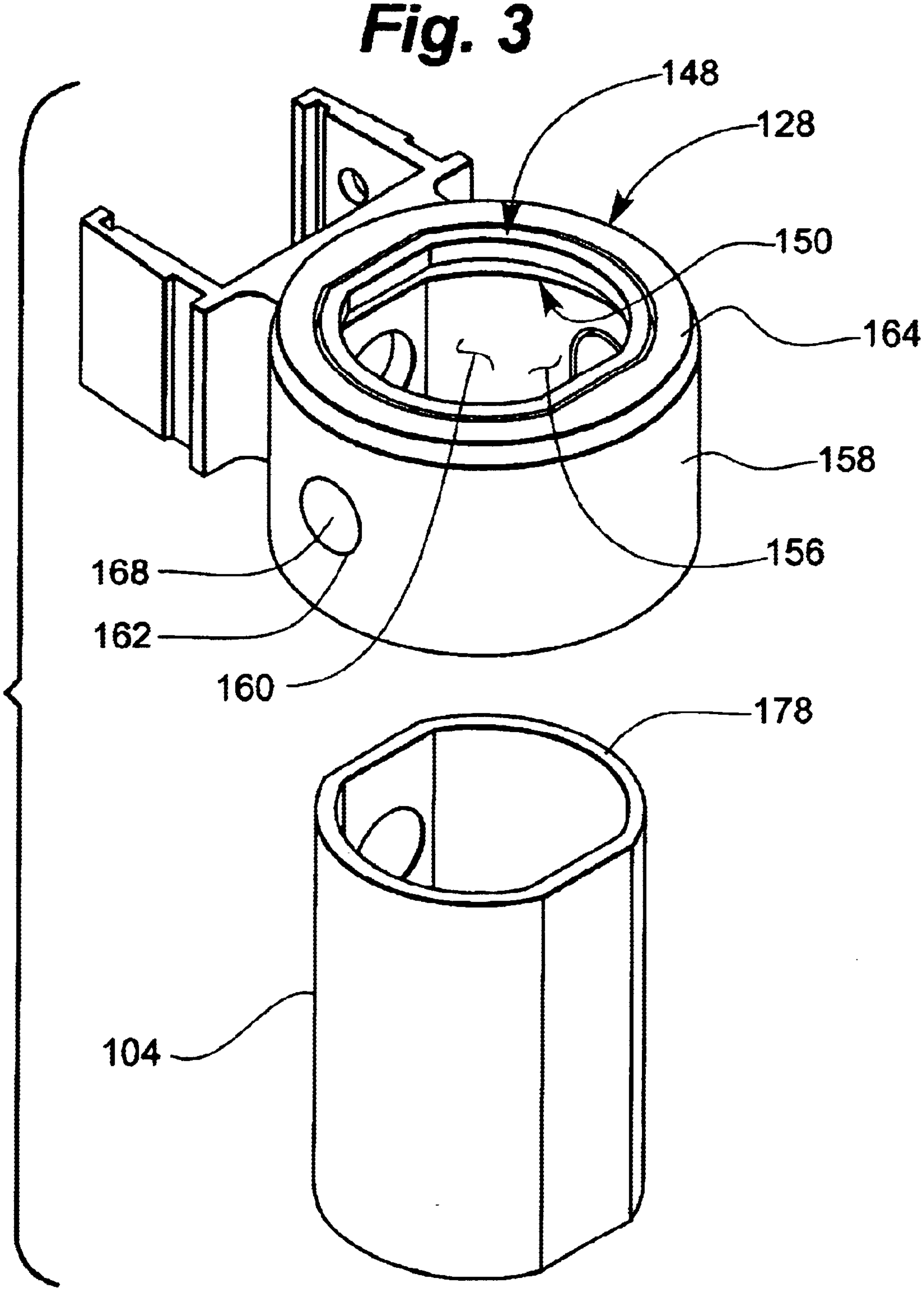
FIG. 3 is a perspective view of an additional assembly including the connector shown in the previous figure.

FIG. 3 is a perspective view of an additional assembly including connector 128 shown in the previous figure. In the embodiment of FIG. 3, ring 148 and ferrule 150 are both disposed within socket 160 of connector 128. In FIG. 3 it may be appreciated that ring 148 is axially captured between ferrule 150 and shoulder 164 of connector 128. A protrusion 168 of ferrule 150 can be seen disposed in hole 162 defined by ferrule 150.

In FIG. 3 it may be appreciated that annular wall 158 of connector 128 is disposed about the circumference of ring 148. Embodiments of the present invention are possible in which connector 128 and ferrule 150 are dimensioned so that ring 148 is allowed to float slightly relative to connector 128 and ferrule 150. In some embodiments, for example, a predetermined level relative motion is provided between first column 104 and ring 148. When this is the case, the magnitude of the predetermined relative motion between the first column and the ring may be selected to allow the ring to assume a desired alignment with other ladder components.

A first column 104 having a distal end 178 is also shown in FIG. 3. In a preferred embodiment of the present invention, receptacle 156 of ferrule 150 is dimensioned to receive a distal portion of a first column 104. In a particularly advantageous embodiment of the present invention, receptacle 156 of ferrule 150 and first column 104 are dimensioned to form an interference fit type of interconnection when first column 104 is inserted into receptacle 156.

Figure 4:
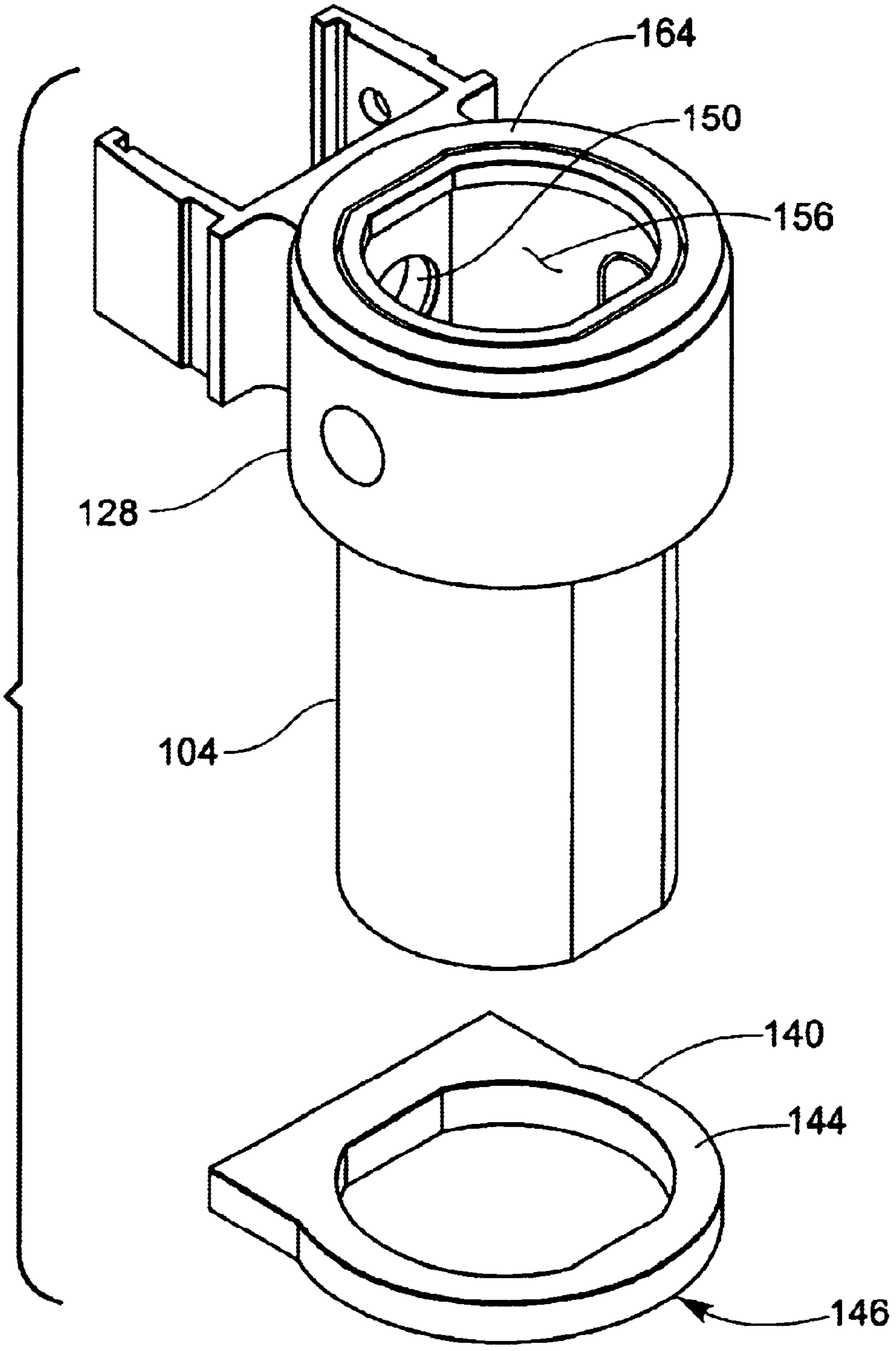
FIG. 4 is a perspective view of an assembly including the connector shown in FIG. 2.

FIG. 4 is a perspective view of an assembly including connector 128 shown in the previous figure. In FIG. 4 it may be appreciated that a distal portion of first column 104 is disposed within receptacle 156 defined by ferrule 150. In some embodiments, an interference fit is formed between ferrule 150 and first column 104. When this is the case, first column 104 may have an outer extent which is dimensioned to be slightly larger than an inner extent of receptacle 156 of ferrule 150. In some embodiments of the present invention, shoulder 164 of connector 128 is dimensioned to extend over distal end 178 of first column 104.

A collar 140 is also shown in FIG. 4. Collar 140 includes a first landing surface 144 and a second landing surface 146. In some embodiments of the present invention, collar 140 is dimensioned so that connector 128 will contact first landing surface 144 and a second connector will contact second landing surface 146 when a ladder including collar 140 is placed in a collapsed state.

Figure 5:
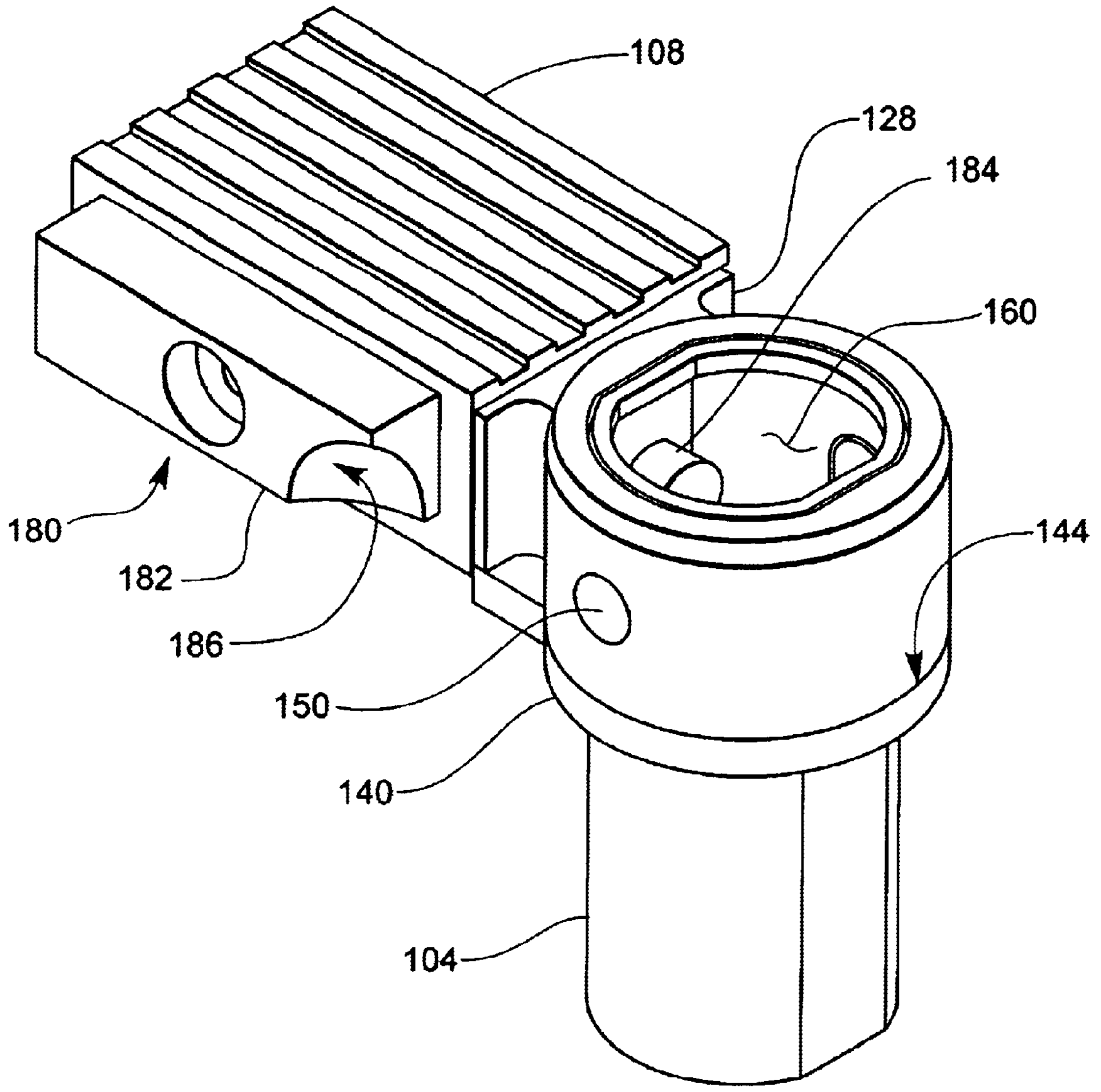
FIG. 5 is a perspective view of still another assembly including the connector shown in FIG. 2.

FIG. 5 is a perspective view of still another assembly including connector 128. In the embodiment of FIG. 5, collar 140 is disposed about first column 104. Collar 140 is positioned so that first landing surface 144 of collar 140 contacts connector 128. In a preferred embodiment of the present invention, ferrule 150 is completely disposed within socket 160 of connector 128. Also in a preferred embodiment, a gap is present between ferrule 150 and collar 140 (i.e., ferrule 150 does not contact collar 140). When this is the case, connector 128 and collar 140 may act to isolate ferrule 150 from the impacts associated with collapsing a ladder including the assembly of FIG. 6.

The assembly of FIG. 5 also includes a latch mechanism 180 including a button 182 and a pin 184. In the embodiment of FIG. 5, pin 184 is disposed in an extended position in which pin 184 extends into socket 160 defined by connector 128. In some embodiments of the present invention, pin 184 is biased to assume the extended position, for example, by a spring. When this is the case, pin 184 may be selectively urged to assume a retracted position by applying a pushing force to button 182 in a direction generally extending away from connector 128.

In FIG. 5 it may be appreciated that button 182 includes a depression 186. In some advantageous embodiments of the present invention, depression 186 is dimensioned to receive a tip portion of the thumb of a ladder users hand. In some particularly advantageous embodiments of the present invention, depression 186 is dimensioned and positioned to receive a tip portion of the thumb of a ladder users hand while first column 104 is grasped between a palm of the hand and at least one finger of the hand. A rung 108 is fixed to connector 128 in the embodiment of FIG. 5.

Figure 6:
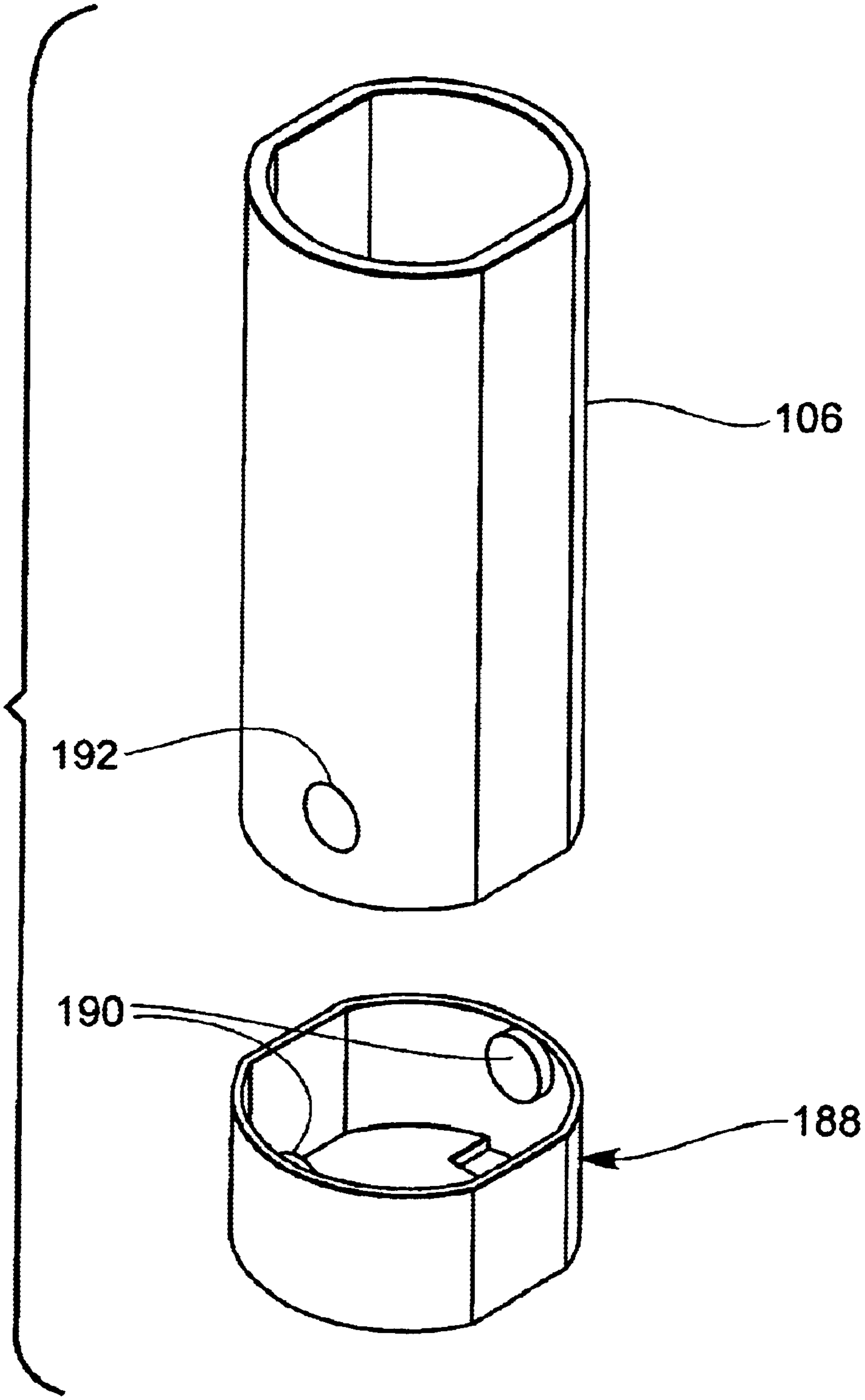
FIG. 6 is an exploded perspective view of a column assembly in accordance with an exemplary embodiment of the present invention.

FIG. 6 is an exploded perspective view of a column assembly in accordance with an exemplary embodiment of the present invention. The column assembly of FIG. 6 includes a second column 106 and a sleeve 188. In some embodiments of the present invention, sleeve 188 is selectively coupled to second column 106 at an interlocking connection. In the embodiment of FIG. 6 sleeve 188 includes a plurality of protuberances 190 and a wall of second column 106 defines a plurality of openings 192. In the embodiment of FIG. 6, openings 192 and protuberances 190 are dimensioned so that protuberances 190 can be received within openings 192 to form an interlocking connection.

A method for assembling a ladder in accordance with the present invention may comprise the steps of 1) providing a connector having an annular wall defining a socket and a hole communicating with the socket; 2) inserting a ring into the socket of the connector; 3)inserting a ferrule into the socket of the connector; 4) locking the ferrule relative to the connector; and 5) inserting a column into a receptacle defined by the ferrule. In some advantageous methods, an interference fit joint is formed when the column is inserted into the receptacle defined by the ferrule. Also in some advantageous methods, the step of locking the ferrule relative to the connector comprises directing at least one protrusion of the ferrule into a hole of the connector.

Figure 7:
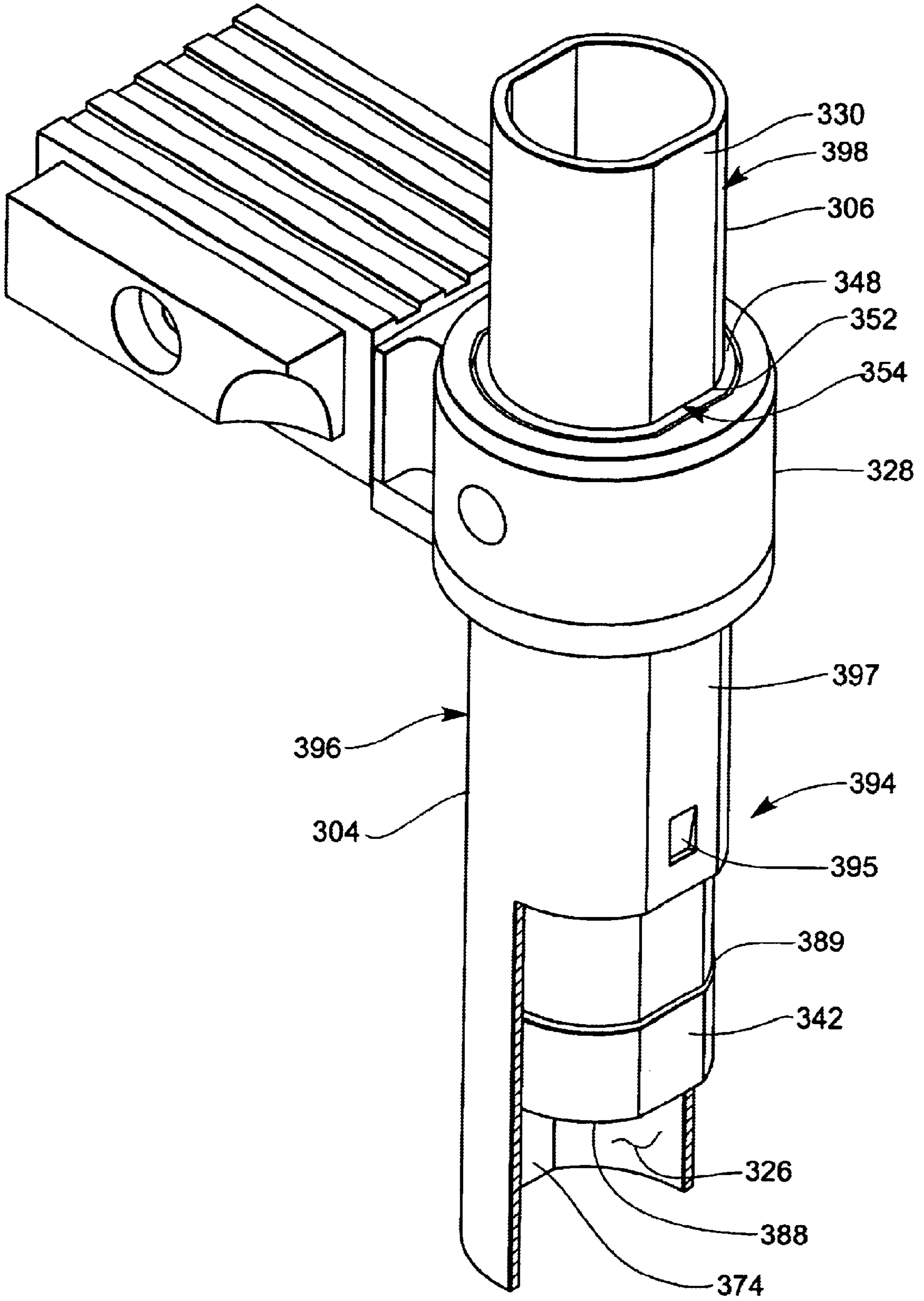
FIG. 7 is a perspective view of an assembly including a first column assembly and a second column assembly.

FIG. 7 is a perspective view of an assembly including a first column assembly 396 and a second column assembly 398. First column assembly 396 includes a first column 304 and a ring 348 that is coupled to first column 304 by a connector 328. Second column assembly 398 includes a second column 306 and a sleeve 388 that is coupled to second column 306 proximate a proximal end thereof.

In the embodiment of FIG. 7, second column 306 is partially disposed within a lumen 326 of first column 304 and extends through an aperture 354 defined by an internal guiding surface 352 of ring 348. In FIG. 7, internal guiding surface 352 of ring 348 can be seen contacting an exterior surface 330 of second column 306. First column 304 is shown in a cutaway fashion in FIG. 7 so that external guiding surface 342 of sleeve 388 can be seen contacting internal surface 374 of the first column 304.

In the embodiment of FIG. 7, first column assembly 396 and second column assembly 398 contact one another only where internal guiding surface 352 contacts exterior surface 330 of second column 306 and where external guiding surface 342 contacts internal surface 374 of first column 304. In some advantageous embodiments, first column 304 comprises a first material and sleeve 388 comprises a second material different from the first material. Also in some advantageous embodiments, second column 306 comprises a first material and ring 348 comprises a second material different from the first material. In these advantageous embodiments, the use of dissimilar materials at sliding contact points may reduce the likelihood that material galling will occur. In some embodiments, the columns comprise aluminum, while the ring and the sleeve each comprise a polymeric material.

First column 304 of FIG. 7 includes a stop 394 comprising an inward projection 395. In the embodiment of FIG. 7, inward projection 395 comprises a portion of a wall 397 of first column 304 which has been displaced inwardly. Also in the embodiment of FIG. 7, sleeve 388 includes a mating surface 389. In a preferred embodiment, mating surface 389 of sleeve 388 and stop 394 of first column 304 are dimensioned and positioned to contact one another when a desired level of extension between first column 304 and second column 306 has been reached.

In FIG. 7 it may be appreciated that first column 304 and second column 307 have shapes which include flat surfaces. In the embodiment of FIG. 7, first column 304 and second column 307 are shaped so as to preclude relative rotation therebetween.

Figure 8:
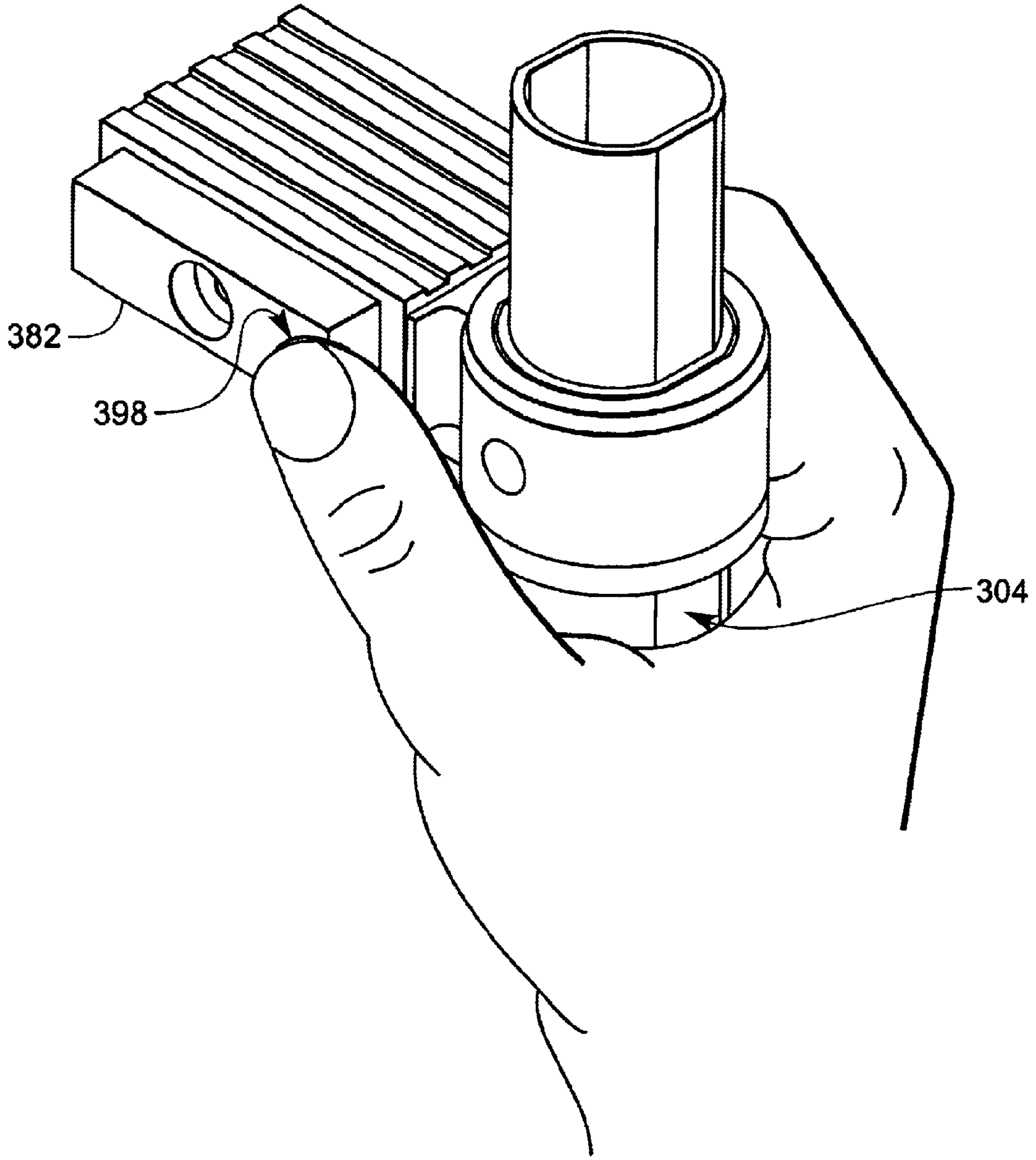
FIG. 8 is an additional perspective view of the assembly of the previous figure.

FIG. 8 is an additional perspective view of the assembly of the previous figure. In FIG. 8, a hand is shown disposed about first column 304. A tip portion of a thumb has been received by a depression 386 of button 382.

Figure 9:
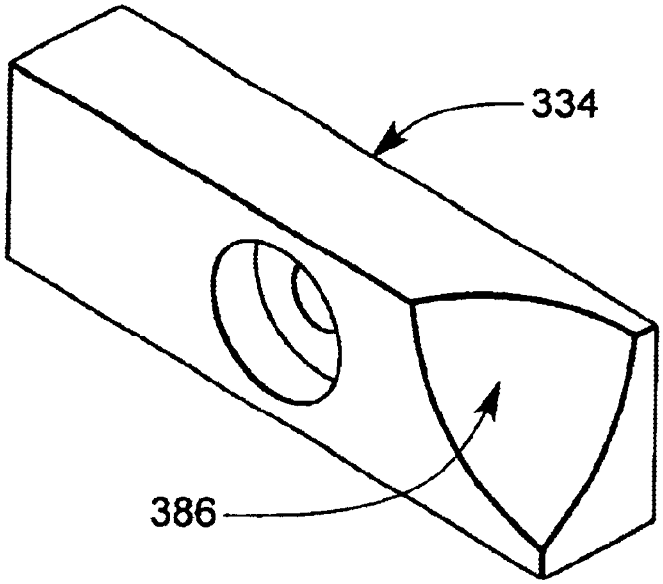
FIG. 9 is a perspective view of a left button and a right button.
Figure 9:
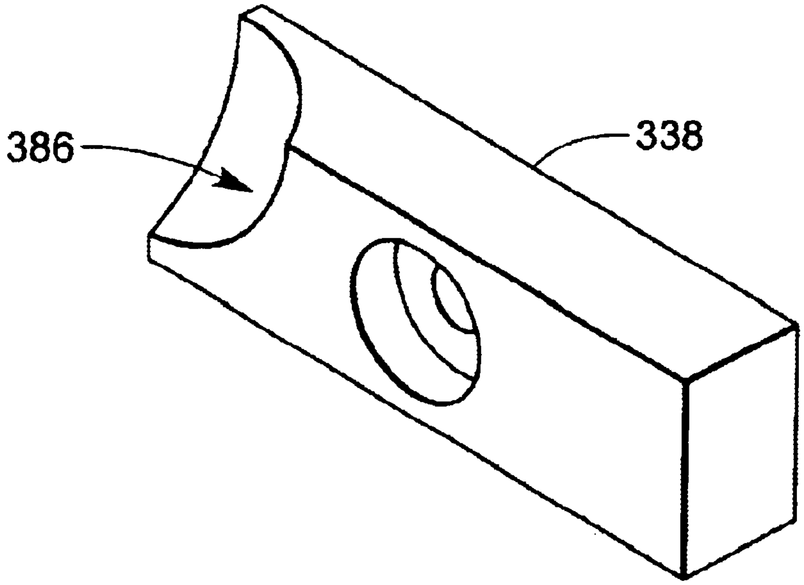

FIG. 9 is a perspective view of a left button 334 and a right button 338. In FIG. 9 it may be appreciated that left button 334 and right button 338 each include a depression 386. In the embodiment of FIG. 9, left button 334 has a shape which is generally a mirrored image of the shape of right button 338.

Figure 10:
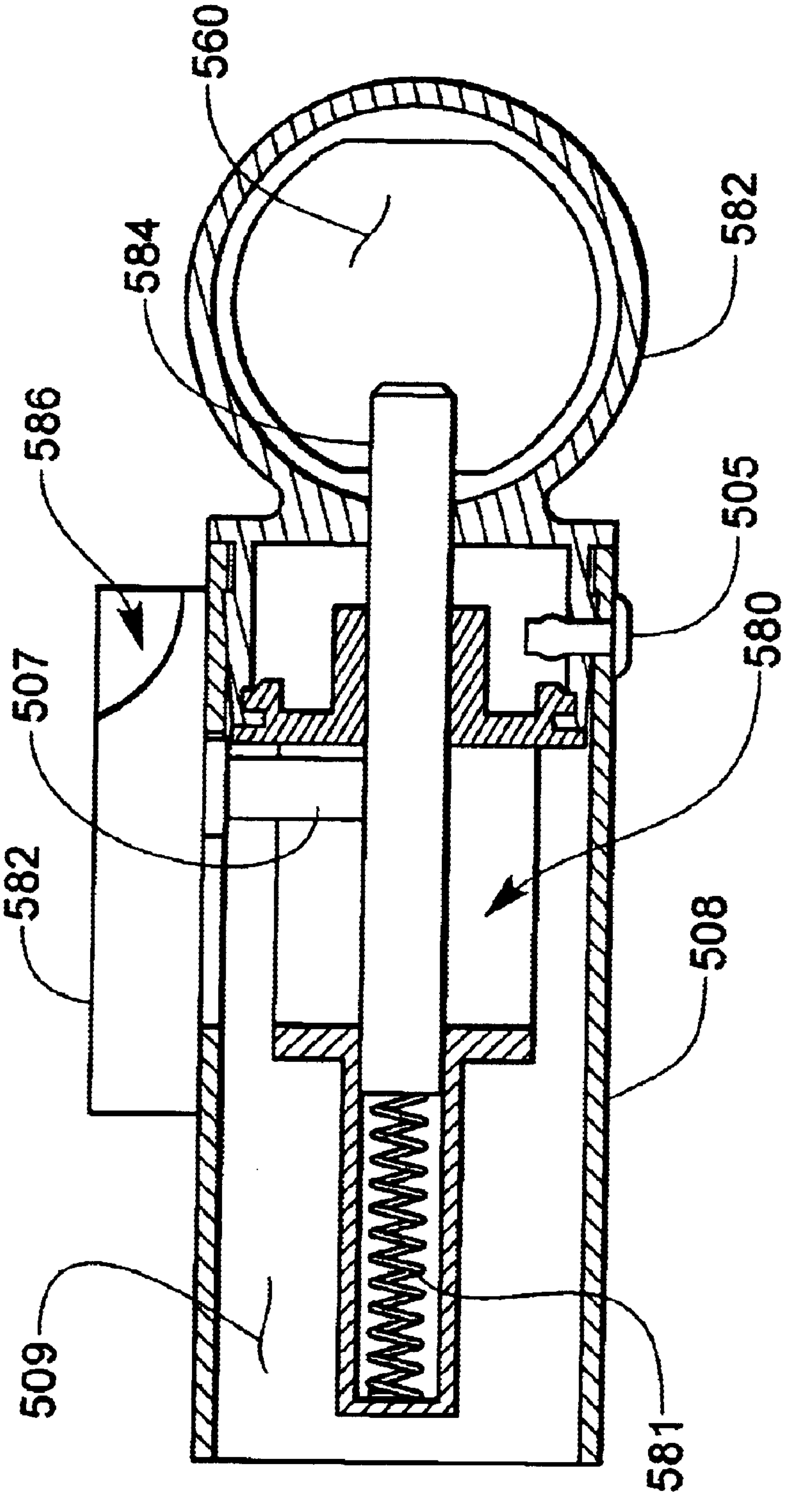
FIG. 10 is a cross sectional view of an assembly in accordance with an exemplary embodiment of the present invention.

FIG. 10 is a cross sectional view of an assembly in accordance with an exemplary embodiment of the present invention. The assembly of FIG. 10 includes a connector 528 and a rung 508. If FIG. 10, it may be appreciated that a portion of connector 528 is disposed within a cavity 509 defined by rung 508. In the embodiment of FIG. 10, connector 528 is fixed to rung 508 by a rivet 505.

The assembly of FIG. 10 also includes a latch mechanism 580 including a pin 584 and a button 582 which is coupled to pin 584 by a shoulder bolt 507. In the embodiment of FIG. 10, pin 584 is disposed in an extended position in which pin 584 extends into a socket 560 defined by connector 528. Also in the embodiment of FIG. 10, pin 584 is biased to assume the extended position by a spring 581. Pin 584 may preferably be selectively urged to assume a retracted position by applying a pushing force to button 582 in a direction generally extending away from connector 528. Button 582 includes a depression 586 which is preferably dimensioned to receive a tip portion of a human thumb.

Figure 11:
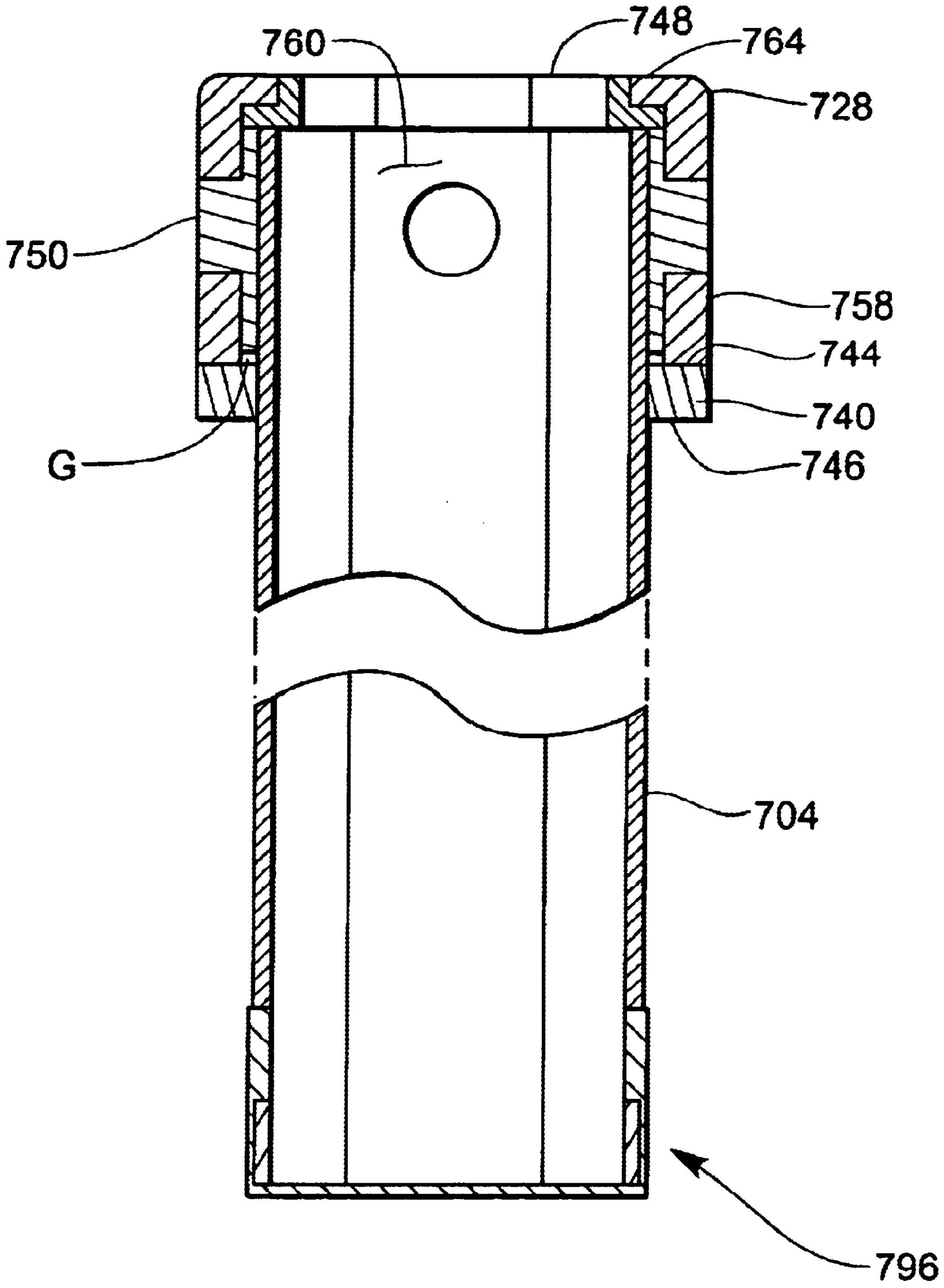
FIG. 11 is a cross sectional view of a first column assembly in accordance with an additional exemplary embodiment of the present invention.

FIG. 11 is a cross sectional view of a first column assembly 796 in accordance with an additional exemplary embodiment of the present invention. First column assembly 796 includes a first column 704 and a ring 748 that is coupled to first column 704 by a connector 728. Connector 728 comprises an annular wall 758 defining a socket 760 and a shoulder 764 which can be see protruding inward from annular wall 758. In some embodiments, a rung is coupled to first column 704 via connector 728. In the embodiment of FIG. 11, shoulder 764 extends over a distal end of first column 704 so that the weight of a person standing on the rung is transferred to the distal end of first column 704 by shoulder 764.

A collar 740 is also shown in FIG. 11. Collar 740 includes a first landing surface 744 and a second landing surface 746. In some embodiments of the present invention, collar 740 is dimensioned so that connector 728 will contact first landing surface 744 and a second connector will contact second landing surface 746 when a ladder including collar 740 is placed in a collapsed state.

In the embodiment of FIG. 11, a ring 748 and a ferrule 750 can be seen disposed within socket 760 of connector 728. In FIG. 11 it may be appreciated that a gap G is present between ferrule 750 and collar 740. Thus, in the embodiment of FIG. 11, ferrule 750 does not contact collar 740. In the embodiment of FIG. 11, connector 728 and collar 740 may act to isolate ferrule 750 from the impacts associated with collapsing a ladder including collar 740.

Figure 12:
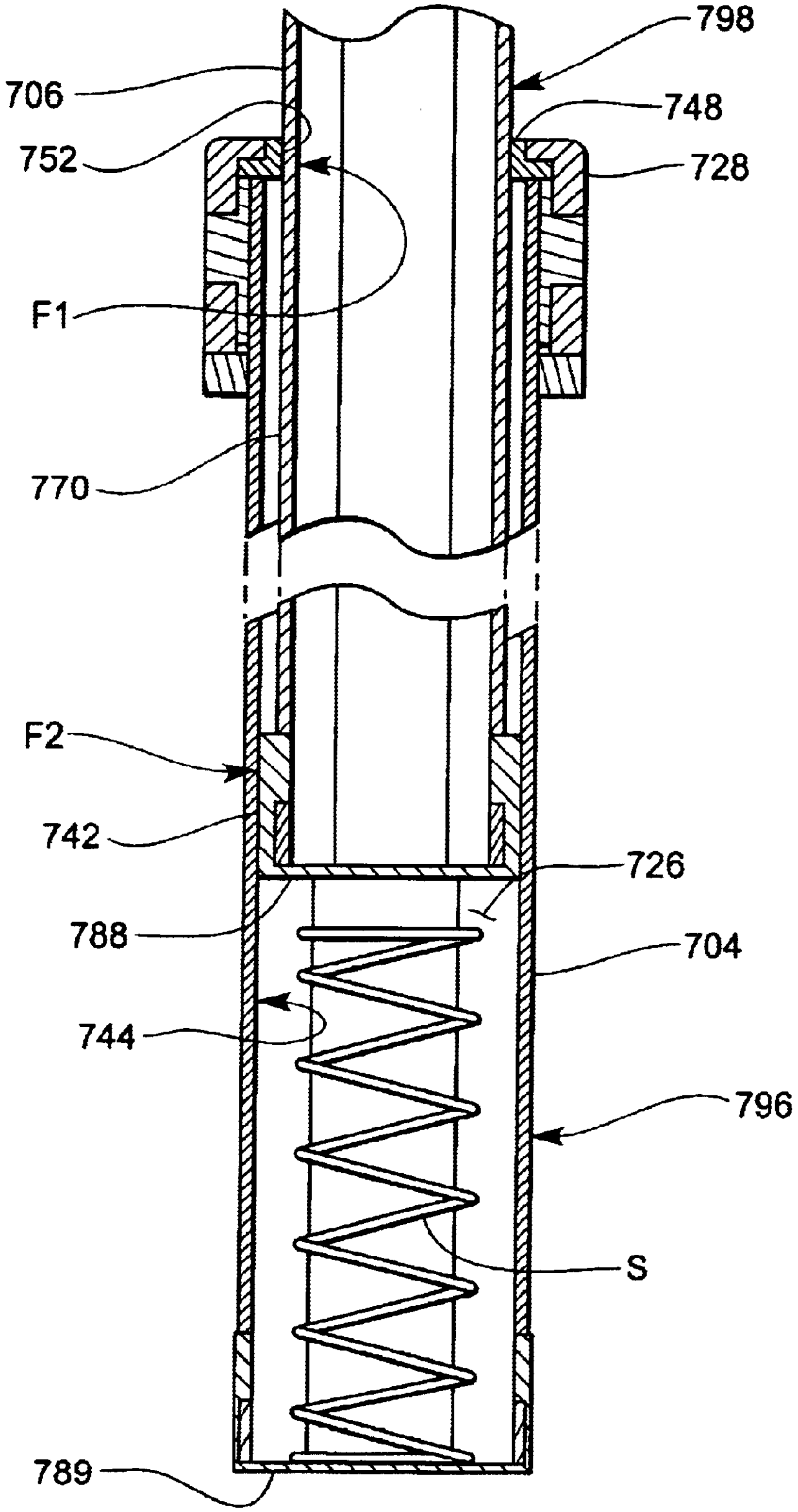
FIG. 12 is a cross sectional view of an assembly including the first column assembly of the previous figure and a second column assembly.

FIG. 12 is a cross sectional view of an assembly including first column assembly 796 of the previous figure and a second column assembly 798. First column assembly 796 includes a first column 704 and a ring 748 that is coupled to first column 704 by a connector 728. Second column assembly 798 includes a second column 706 and a sleeve 788 that is coupled to second column 706 proximate a proximal end thereof.

In the embodiment of FIG. 12, second column 706 is partially disposed within a lumen 726 of first column 704 and extends through an aperture defined by an internal guiding surface of ring 748. In FIG. 12, an internal guiding surface 752 of ring 748 can be seen contacting an exterior surface 770 of second column 706. Also in FIG. 12, external guiding surface 742 of sleeve 788 can be seen contacting internal surface 774 of the first column 704.

In the embodiment of FIG. 12, first column assembly 796 and second column assembly 798 contact one another only at a first interface F1 where internal guiding surface 752 contacts exterior surface 770 of second column 706 and a second interface F2 where external guiding surface 742 contacts internal surface 774 of first column 704.

The assembly of FIG. 12 also includes a spring S which is disposed with a lumen 726 of first column 704. In FIG. 12, spring S is shown seated against a second sleeve 789 which is coupled to first column 704 proximate a proximal end thereof. Embodiments of the present invention are possible in which spring S is compressed between sleeve 788 and second sleeve 789 when a ladder including spring S in placed in a collapsed state.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. A ladder, comprising:

a first stile, a second stile and a plurality of rungs extending between the first stile and the second stile;

the first stile comprising a first column assembly and a second column assembly;

the first column assembly including a first column and a ring coupled to the first column proximate a distal end thereof;

the second column assembly including a second column and a sleeve coupled to the second column proximate a proximal end thereof;

the second column being at least partially disposed within a lumen defined by an internal surface of the first column;

the sleeve including an external guiding surface for contacting the internal surface of the first column; and the ring including an internal guiding surface for contacting an exterior surface of the second column.

2. The ladder of claim 1, wherein the first column assembly and the second column assembly contact one another only where the internal guiding surface contacts the exterior surface of the second column and where the external guiding surface contacts the internal surface of the first column.

3. The ladder of claim 1, wherein the first column comprises a first material and the sleeve comprises a second material different from the first material.

4. The ladder of claim 3, wherein the first material and the second material comprise materials which are unlikely to gall when placed in sliding contact with one another.

5. The ladder of claim 3, wherein the first material and the second material comprise materials which provide a relatively low friction interface when placed in sliding contact with one another.

6. The ladder of claim 3, wherein the first material comprises aluminum and the second material comprises a polymeric material.

7. The ladder of claim 1, wherein the second column comprises a first material and the ring comprises a second material different from the first material.

8. The ladder of claim 7, wherein the first material and the second material comprise materials which are unlikely to gall when placed in sliding contact with one another.

9. The ladder of claim 7, wherein the first material and the second material comprise materials which provide a relatively low friction interface when placed in sliding contact with one another.

10. The ladder of claim 7, wherein the first column assembly further includes a sleeve coupled to the first column proximate a proximal end thereof;

the sleeve including an external guiding surface for contacting an internal surface of another column.

11. The ladder of claim 1, wherein the second column assembly further includes a second ring coupled to the second column by a second connector;

the second ring including an internal guiding surface for contacting an exterior surface of another column.

12. The ladder of claim 11, further including a collar disposed about the second column;

the collar being disposed between the sleeve and the second ring; and the collar being dimensioned so that the connector will contact a first landing surface of the collar and the second connector will contact a second landing surface of the collar when the ladder is placed in a collapsed state.

13. The ladder of claim 1, wherein the ring is coupled to the first column in a manner which allows the ring to float relative to the first column.

14. The ladder of claim 1, wherein the ring is coupled to the first column by a connector which retains the ring in axial and radial directions relative to the first column while, at the same time, permitting some relative motion between the first column and the ring.

15. The ladder of claim 14, wherein the relative motion provided between the first column and the ring has a magnitude which is sufficient to allow the ring to assume a position in which the internal guiding surface of the ring is disposed in coaxial alignment with the external guiding surface of the sleeve.

16. The ladder of claim 1, wherein the ring is coupled to the column by a connector comprising an annular wall and a shoulder extending over a distal end of the first column.

17. The ladder of claim 1, wherein the sleeve further includes a landing surface and the first column includes a stop.

18. The ladder of claim 17, wherein the landing surface of the sleeve contacts the stop when a desired level of extension between the first column and the second column has been reached.

19. The ladder of claim 17, wherein the stop comprises an inward projection.

20. The ladder of claim 19, wherein the inward projection comprises a portion of a wall of the first column which has been displaced inwardly.

21. The ladder of claim 1, wherein the sleeve is coupled to the second column at an interlocking connection.

22. The ladder of claim 21, wherein the sleeve includes a plurality of protuberances which are received within openings of the second column for fixing the sleeve to the second column.

23. The ladder of claim 1, further including a ferrule interposed between the external surface of the first column and an annular wall of the connector.

24. The ladder of claim 23, wherein the ferrule and the first column are fixed to one another at a friction interconnection.

25. The ladder of claim 23, wherein the ferrule and the first column are fixed to one another at an interference fit joint formed between the ferrule and the first column.

26. The ladder of claim 23, wherein the ferrule and the connector are fixed to one another at an interlocking connection.

27. The ladder of claim 26, wherein the interlocking connection comprises at least one protrusion of the ferrule which is received by a hole of the connector.

28. A method for assembling a ladder comprising a first stile, a second stile and a plurality of rungs extending between the first stile and the second stile, the method comprising the steps of:

providing a connector having an annular wall defining a socket and a hole communicating with the socket;

fixing a rung to the connector;

inserting a ring into the socket of the connector;

inserting a ferrule into the socket of the connector;

locking the ferrule relative to the connector; and inserting a column of the first stile, into a receptacle defined by the ferrule for coupling the rung to the first stile.

29. The method of claim 28, wherein an interference fit joint is formed when the column is inserted into the receptacle defined by the ferrule.

30. The method of claim 28, wherein the step of locking the ferrule relative to the connector comprises directing at least one protrusion of the ferrule into a hole of the connector.

* * * * *